United States Patent Office 3,065,054
Patented Nov. 20, 1962

3,065,054
SYNTHETIC CRYSTALLINE ZEOLITE PRODUCED FROM DEHYDRATED ALUMINUM SILICATE
Walter L. Haden, Jr., Metuchen, and Frank J. Dzierzanowski, New Brunswick, N.J., assignors to Minerals & Chemicals Philipp Corporation, a corporation of Maryland
No Drawing. Filed June 2, 1959, Ser. No. 817,472
8 Claims. (Cl. 23—112)

The subject invention relates to a method for converting certain dehydrated aluminum silicates, such as dehydrated kaolin clay, into a synthetic crystalline zeolite which, upon dehydration, yields a sorbent of controlled effective pore diameter and which is generally known as a "molecular sieve." The invention relates, more specifically, to such a method in which the sorbent and its zeolitic precursor are provided in the form of relatively large coherent attrition-resistant crystalline aggregates, as opposed to pulverulent masses. The invention relates also to the novel products thus produced.

A development in the field of adsorbents which has attracted widespread interest has been the production of so-called "molecular sieves." These are synthetic, crystalline alumino-silicate materials chemically similar to many clays and feldspars, and belonging to the class of minerals known as zeolites. The zeolites possess the characteristic of being able to undergo dehydration with little, if any, change in crystal structure. When dehydrated, the crystals are interlaced with regularly spaced channels of molecular dimensions and of quite uniform size, which led to the term "molecular sieve."

Several types of sieves are commercially available, each of which has a characteristic size of pore. They are being or can be used for a wide variety of applications, some of those with the greatest potential being as a desiccant for drying a wide variety of materials to extremely low moisture content, inpurifying high quality chemicals and in upgrading gasoline by selective removal of straight chain hydrocarbons. An application which has received recent wide publicity is as a carrier for high activity accelerators for the rapid cure of plastics and rubber, in which case the sieves greatly simplify storage and processing problems by maintaining the active chemical in latent state, isolated from the system, during processing and storing, releasing it to function in its normal manner at the elevated curing or vulcanization temperature.

Molecular sieves are available in several types, designated, for example, as 3A, 4A and 5A. Type 3A and type 4A sieves are dehydrated potassium and sodium zeolites, respectively, and type 5A, the dehydrated calcium zeolite; the three zeolites having the same crystalline structure and being readily interchangeable by simple base-exchange procedures. The numerical positions of the type designations refer to approximate pore dimensions in Angstrom units. The formula for members of the type A zeolites from which the type A sieves are prepared by dehydration may be represented by the following approximate empirical formula:

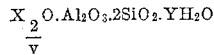

wherein "X" represents a metal in groups I and II of the periodic table, transition metals of the periodic table, hydrogen or ammonium, or mixtures of the aforementioned; "$v$" represents the valence of X; and Y varies with the nature of X and may be any number up to about 6. Thus, for example, the empirical formula for the 4A zeolite is $Na_2O \cdot Al_2O_3 \cdot 2SiO_2 \cdot 4-5H_2O$. The sodium form of zeolite A may be considered the parent of the other type A zeolites in that it can be base-exchanged with other group I and with group II metal ions, etc., to prepare the other members of the type A zeolites described by the empirical formula given above.

The 4A molecular sieve, the activated from of sodium zeolite A, has the empirical formula $Na_2O \cdot Al_2O_3 \cdot 2SiO_2$ and is particularly useful as a selective sorbent for water, although it is also useful in selectively sorbing low molecular weight hydrocarbon vapors from mixtures of low molecular weight hydrocarbons with higher molecular weight hydrocarbons. For example, the 4A molecular sieve is useful in sorbing certain $C_2$ and $C_3$ hydrocarbons from mixtures with higher molecular weight hydrocarbons. The 5A molecular sieve is useful in selectively sorbing normal hydrocarbons from mixtures with branched chained hydrocarbons.

The extensive use of the type A sieves is, however, curtailed by their high cost which reflects the involved processing as well as the relatively expensive raw materials involved in their preparation. The price of molecular sieves is at present prohibitive for all but a few specific commercial applications. Aside from their high cost, another detractive feature of the commercially available sieves and those described in the literature is that their physical form leaves much to be desired. Mineral sorbents find widespread use in moving and fixed bed adsorption processes, and in such processes, the sorbent is employed in the form of coarse particles. In moving and fixed bed processes it is necessary to use particles of sufficient size that the pressure drop is small; sorbent particles as coarse as 4/8-mesh or as fine as 60/100-mesh are employed in commercial moving and fixed bed processes. In slurry processes or other processes in which the sorbent is mixed or carried cocurrent with the fluid, particles in the range 100/325-mesh are used; such particles must be free from fines, e.g., material finer than about 325-mesh since it is difficult to separate such fines from the fluid, as is known to those skilled in the art. In fluidized bed processes particles of 100/325-mesh are used; experience has shown that not more than about 20 percent of the weight of the particles should be finer than about 40 microns since such fines represent an economic loss during processing. In all of the aforementioned types of processes, the sorbent particles may be irregular in shape, but are preferably in the form of smooth or regular contoured masses such as spheres or cylinders. In the case of the contact masses used in moving and fixed bed processes, it is desirable to employ smooth particles to minimize pressure drop in the system. Moreover, smooth particles are harder or more attrition-resistant than like particles of irregular contour and are less apt to wear away and produce undesirable dust during use, regeneration or other handling. In the case of the relatively fine particles used in the slurry and fluidized bed processes, spherical particles are preferred to irregular particles because of their superior resistance to attrition.

Prior art methods of producing synthetic crystalline type A zeolites are basically inconsistent with the provision of coarse particle size sorbents inasmuch as the resulting zeolite crystals inherently are in finely divided, powdered form, typically 0.1 to 10 microns material, with occasional production of somewhat coarser crystals, such as 100 microns, or finer crystals, such as 0.01 micron being reported. In order to agglomerate the powdered zeolites or sorbents, binders, such as colloidal clays or hydrous alumina are used. Typically, the zeolite powder is extruded with the binder, and pellets of suitable size are cut from the extrudate. The pellets are then fired to harden the binder. In order to produce pellets of adequate resistance to attrition, substantial quantities of binder are used, often up to 20 percent or more, based on the weight of the active sorbent. As a result, the pelleted sorbent is substantially diluted and the sorptive capacity of a unit weight is decreased in proportion to the quantity of binder used. Moreover, the coherency of the bound powder leaves much to be desired in that the material is relatively easily attrited during storage and use. Obviously, it would be highly desirable to able to synthesize type A zeolites and molecular sieves directly in the form of large attrition-resistant aggregates of homogeneous polycrystalline composition and, more particularly, to synthesize such zeolites and sieves in the form of pellets or other regularly shaped masses of the desired particle size.

Accordingly, it is an object of the present invention to provide a method for preparing type A zeolites and sorbents which obviates the aforementioned difficulties.

Another object of the invention is the provision of a method to synthesize type A zeolites and molecular sieves directly in the form of coherent aggregates of substantially homogeneous polycrystalline composition as contrasted with the powdered form which results from prior art methods for making such zeolites.

A more particular object is the provision of such a method in which kaolin clay, an inexpensive, naturally occurring, abundant material, is employed as the sole source of silica and alumina.

Still another object of the invention is the provision of essentially pure homogeneous type A zeolites and sieves in the form of self-bound shaped masses which are highly resistant to attrition and which resist disintegration even in the presence of liquid water.

These and further objects and advantages, which will be apparent to those skilled in the art, are realized in accordance with the present invention wherein the synthetic crystalline zeolite which is the precursor of the type A molecular sieve is made from certain dehydrated aluminum silicates hereafter set forth by a process in which the zeolite is formed directly as relatively large coherent aggregates of substantially pure homogeneous polycrystalline composition, rather than in the form of a powder, as in prior art methods.

The term "aluminum silicate," as used herein refers to a material, natural or synthetic, consisting essentially of alumina and silica in which there is bonding between aluminum atoms and silicon atoms through oxygen linkage (as opposed to mechanical mixtures of silica and alumina). The term "dehydrated aluminum silicate" refers to such a material in which water of hydration is substantially eliminated. The term "aluminum silicate" excludes those materials, natural or synthetic, in which more than contaminating quantities of metal ions, e.g., calcium, magnesium, iron, sodium and combinations thereof, are bonded to the aluminum and/or silicon in the structure. Such materials are termed, for example, "sodium aluminosilicates," "calcium aluminosilicates," etc. Small amounts of mechanically associated or bonded impurities may be present in the aluminum silicates useful in the practice of the subject invention, although preferably such impurities are not present.

Broadly stated, the present invention contemplates the direct conversion of certain water-insoluble dehydrated aluminosilicates by the acition of concentrated sodium hydroxide solution into hard compact masses of the substantially pure synthetic crystalline zeolite of the empirical formula:

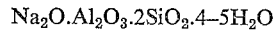

$$Na_2O.Al_2O_3.2SiO_2.4-5H_2O$$

In accordance with the method of our invention, we provide a mass of a substantially homogeneous mixture of a dehydrated aluminum silicate having a $SiO_2/Al_2O_3$ mol ratio of about 2.0, such as dehydrated kaolin clay and dehydrated aluminum silicate cracking catalyst, natural or synthetic, and having a $SiO_2/Al_2O_3$ mol ratio of about 2, and a concentrated aqueous solution of NaOH, said aqueous solution having a concentration such that the $H_2O/Na_2O$ mol ratio in the mixture is within the range of from about 4.5–11.5 and being present in an amount such that the $Na_2O/SiO_2$ mol ratio in the mixture is about 0.5.

The alkali is then reacted with the alumina and/or silica of the dehydrated aluminum silicate until substantially all of the alkali is consumed, such reaction being carried out while controlling the temperature of the mass below that at which water will be evaporated from the mass at the pressure employed and in the absence of an aqueous liquid phase external to and in contact with the mass. The reaction product is a coherent mass of substantially homogeneous amorphous composition and is the precursor of the desired synthetic crystalline zeolite. The amorphous reaction product is then aged without substantial dehydration thereof, preferably at elevated temperature under autogenous pressure or greater, to crystallize the material into the desired substantially homogeneous polycrystalline zeolite of the empirical formula $Na_2O.Al_2O_3.2SiO_2.4–5H_2O$ in the form of a hard coherent mass of essentially the same volume as the original aluminum silicate-alkali mass.

An important feature of the method of our invention is that the reaction between the dehydrated aluminum silicate and alkali must be carried out while a uniform mixture thereof is in the form of a compact mass or masses. The term "compact mass" as used herein refers to a dense or substantially nonporous mass. Only such dense masses react to provide a sufficient number of structural bridges between crystals to form the zeolite in the desired form of hard crystalline aggregates occupying essentially the same volume as the unreacted mass as opposed to the finely divided or pulverulent masses inherently formed in carrying out prior art methods for producing the synthetic crystalline zeolite A.

Preferably the method of our invention involves the step of providing the mixture of dehydrated aluminum silicate and caustic solution in the form of compact masses of the shape and size desired for the ultimate zeolitic material prior to the advance of the reaction therebetween since such form can be retained throughout the process of our invention.

The synthetic zeolite thus formed may then be dehydrated to provide a molecular sieve, which will have an effective pore diameter of about 4 Angstrom units or, as is known in the art, the synthetic zeolite may be base-exchanged with other ions of metals in group I or with ions of metals of group II of the periodic table, hydrogen or ammonium ions, etc., to provide other type A zeolites which upon dehydration, become sieves of different effective pore diameters.

The zeolites and sorbents prepared in accordance with this procedure are inexpensive and represent a very substantial economic advantage over similar zeolites and sorbents made in accordance with prior art techniques because of the simplicity of the processing, particularly since it obviates the step of binding the zeolitic product into the desired coarse particles.

Moreover, by the method of this invention, we are able to prepare hard pelleted zeolites and sorbents without auxiliary binder material, and thus provide for the first time a substantially pure type A zeolite or sieve material in the form of hard undiluted coherent aggregates which are highly resistant to disintegration, even in the presence of liquid water.

The mass consisting of a substantially homogeneous mixture of dehydrated aluminum silicate and concentrated alkali may be provided in a variety of ways.

In accordance with one form of the invention such a mass is formed by mixing finely divided dehydrated aluminum silicate having a $SiO_2/Al_2O_3$ mol ratio of about 2.0, preferably kaolin clay, with alkali of appropriate concentration.

In accordance with still another form of the invention the mixture is provided by uniformly absorbing a concentrated alkali solution into pores of a mass consisting of a uniformly microporous water-insoluble dehydrated aluminum silicate. According to one embodiment of the latter form of the present invention, the porous aluminum silicate masses we employ as a reactant comprise dehydrated kaolin clay. Such masses are preferably prepared by forming agglomerates of kaolin clay intimately and uniformly admixed with finely divided particles of a combustible pore-inducing material, and burning the combustible particles from the clay matrix, thereby to provide clay masses of improved porosity. Preferably, the clay is dehydrated simultaneously with the firing of the masses to eliminate the combustible organic material therefrom. In accordance with still another embodiment of the latter form of the present invention, the porous aluminum silicate reactant mass is a high alumina content siliceous cracking catalyst, such as is prepared by the acid-activation of kaolin clay. The catalyst may be one composed of particles somewhat off size for use in a commercial cracking unit employing a pelleted or fluid catalyst, or it may be a material discarded because it fails to meet the desiderata of activity and/or selectivity. In such cases, a product which is normally a waste product is converted by our process into a valuable material.

Our invention will be more fully understood by the detailed description and examples thereof which follow.

PREPARATION OF REACTION MASS FROM CRUSHED KAOLIN CLAY

As previously indicated, one form of the method of the present invention is directed to the conversion of crushed or finely divided dehydrated aluminum silicate, preferably dehydrated kaolin clay, into pure hard coherent masses of a synthetic crystalline zeolite. By "kaolin clay" is meant a naturally occurring clay containing at least one of the following as the chief mineral constituent: kaolinite, halloysite, anauxite, dickite and nacrite. The aforementioned minerals are hydrous aluminum silicates whose composition may be represented by the formula:

$$Al_2O_3 \cdot 2SiO_2 \cdot XH_2O$$

where X is usually 2, or 4 in the case of certain halloysites. The weight ratio of $SiO_2$ to $Al_2O_3$ indicated by this formula is 1.177 to 1. The kaolin clay we prefer to employ has a $SiO_2/Al_2O_3$ mol ratio as close to the theoretical value of 2.00 as is possible in order to provide a substantially pure zeolite. However, kaolin clays having somewhat higher or lower $SiO_2/Al_2O_3$ mol ratios, e.g., 2.00±.05, may be used with good results, although the ultimate zeolite will be somewhat less pure than when the ratio is 2.00. An additional source of silica or alumina, e.g., sodium aluminate or silicate, can be incorporated in the clay-alkali mix to adjust the $SiO_2/Al_2O_3$ ratio in the clay-alkali mixture. Thus, in using anauxite, which has a higher $SiO_2/Al_2O_3$ ratio than other kaolin clays, the addition of a small amount of sodium aluminate to the dehydrated kaolin clay-alkali mix is indicated. Kaolin clays are frequently associated with foreign materials such as quartz, and the removal of such materials from the kaolin facilitates the ultimate formation of the high purity type A zeolite. Hence, we prefer to use a kaolin clay which has been treated for removal of grit and foreign bodies, as well as clots of undispersed kaolin clay.

An essential feature of our invention involves the use of substantially completely dehydrated kaolin clay since when the steps hereafter set forth are applied to the hydrated clay, the desired product is not formed. The clay may be dehydrated by calcination at a temperature within the range of from about 800° F. to about 1600° F., and preferably 1200° F. to 1500° F., for a time sufficient to remove substantially completely the water of crystallization from the clay. The calcination time will vary with calcination temperature and with the equipment used. When the clay is calcined at temperature levels lower than about 800° F., the dehydration is not sufficiently extensive to render the clay suitable for total conversion to the zeolite, whereas when calcination is conducted at about 1600° F. or higher undesirable changes in the clay may take place. The clay may be calcined at a temperature somewhat above 1600° F. if the calcination treatment is limited to a period of the order of minutes. At any rate, we find that if the calcination is too severe, the clay is altered with the formation of an unreactive constituent, thought to be mullite. When such an overcalcined clay is reacted in accordance with the method of the present invention, a different crystalline material is formed along with or to the exclusion of the desired type A zeolite. Thus, for the purposes of our invention, we distinguish between "reactive" and "unreactive" dehydrated kaolin clay and are careful to select a "reactive" dehydrated kaolin clay which we consider to be a kaolin calcined under conditions such that high temperature unreactive aluminum silicate, silica or alumina phases are not formed, so that essentially all of the dehydrated clay will react with alkali in amount stoichiometric for the formation of the type A zeolite.

The quantity of concentrated caustic solution we mix with the crushed calcined clay is preferably that which supplies 0.5 mol of $Na_2O$ per mol of $SiO_2$; this theoretical quantity for a kaolin having a $SiO_2/Al_2O_3$ mol ratio of 2.00 calculates to be 9.0 gram mols of alkali per kilogram of clay, based on the volatile free weight of the clay (volatile free weight being the weight of clay after heating essentially to constant weight at 1800° F.). In other words, we preferably employ a 36 percent alkali dosage in our process, alkali dosage being defined as the weight of 100 percent NaOH per weight (volatile free basis) of clay, expressed as a percentage. We may use a quantity of alkali such as to provide somewhat more or less than the theoretical amount of alkali; that is, a $Na_2O/SiO_2$ mol ratio of $$+0.05$$
$$-0.025$$

and realize outstanding conversion of the clay to the zeolite. However, if we use a quantity of alkali less than or in excess of the range set forth above, a highly contaminated or a different product is produced. For example, using about a 50 percent weight excess of NaOH, essentially no sodium zeolite A is formed under the reaction conditions we employ.

It has been mentioned that an important feature of our invention is that the reaction mixture of clay and alkali solution is provided in the form of a compact (or dense) mass. Specifically such a mass should be dense to the extent that at least 0.87 gram of aluminum silicate, on a volatile free basis, is present per cubic centimeter of reaction mixture. Obviously, the maximum permissible density of the mixture is that of the sodium zeolite A, which is about 2.00 grams per cubic centimeter. To provide a reaction mass of suitable density, the aqueous alkali solution must have a concentration such that the $H_2O/Na_2O$ mol ratio is within the range of from about 4.5 to about 11.5. In other words, the weight concentration of NaOH in the aqueous solution that is mixed with the clay is from about 30 percent to about 55 percent. In the event that NaOH solutions of about 45 percent or higher concentration are employed, the mass may be porous due to the friable, dry nature of the mixture and should be compressed prior to reaction to the extent that the concentration of the dehydrated kaolin clay, on a volatile free clay basis, is at least 0.87 gram per cubic centimeter of unreacted mixture. The use of a concentrated caustic solution is thus an essential feature of our invention and we find that if we employ a less concentrated solution, e.g., a 10 or 20 percent solution, we produce a zeolite in the form of a fine powder or very soft aggregate, and thus fail to realize an important objective of our invention. The upper limit of the caustic concentration is dictated by the solubility of the caustic at the reaction temperature, the necessity for confining the quantity of caustic solution to that which will form a compact mass when mixed to apparent homogeneity with the calcined clay and the apparent necessity for having a certain, although limited, quantity of water within the mass during reaction. As a rule, we prefer to use as high a concentration of alkali as is consistent with forming a mix of appropriate consistency, inasmuch as it has been found that the use of solutions of higher alkali concentration favors the provision of an ultimate zeolite or sieve of higher resistance to attrition. Thus, in general, the sieve or zeolite mass prepared by reacting kaolin clay with a NaOH solution of about 50 percent will be harder than a similar sieve or zeolite mass of like size and form prepared with a 30 percent solution.

The first step of this form of the method of our invention involves the step of forming an apparently homogeneous mixture of clay, previously calcined to a reactive state, and concentrated caustic, using the quantities of reactants hereabove set forth. We may employ any suitable apparatus, such as a pug mill, to mix the ingredients. The resultant mix will be a semi-solid mass, the degree of plasticity of which depends largely on the concentration of the alkali solution employed. If the mix is somewhat porous, such as may occur using highly concentrated alkali, we compress the mix in a suitable press or extruder to a density not less than 0.87 gram kaolin (on a volatile free basis) per cubic centimeter of mix.

The compact clay-alkali mix may take any variety of forms or shapes. However, the masses should be at least as large as 325-mesh, and preferably 100-mesh or coarser, so that the benefits of our process may be realized. The compact mix can be reacted in bulk form in the reaction vessel; the reaction product or polycrystalline transformation product thereof may then be granulated into any desired size and form. The preferred embodiment of our invention contemplates the provision of uniformly sized coherent shaped masses of substantially pure zeolite crystals. Pursuant thereto, we mechanically shape a dehydrated clay-alkali mix of suitable consistency to form shaped masses such as by extrusion, drum rolling, molding, pilling, spray drying or any other method known in the art for the purpose.

For example, we have had success in extruding the clay-alkali mix in an auger extruder through a die plate and cutting the extrudate to form uniformly sized pellets of the desired dimension. For use in most gas treating processes, the pellets usually should be 4- to 8-mesh particles. No auxiliary binder is needed to produce our coherent pellets which are highly resistant to attrition and disintegration, even in the presence of liquid water. The pellets, if desired, may be crushed and screened to provide 60/100-mesh particles useful in fixed adsorption processes or 100/325-mesh particles for fluid bed operations, although 100/325-mesh particles are preferably provided by a spray drying procedure. The plasticity of kaolin clay-alkali solutions varies considerably with the clay origin and using many of the commercially available grades of kaolin some difficulty may be experienced in extruding the clay-alkali solution mixture to form the reaction mixture in pelleted form, particularly when using the highly concentrated alkali solutions (e.g., 45 percent to 50 percent or more concentrated NaOH) which, as mentioned before, produce the hardest zeolite product.

It has been found that the incorporation in the dehydrated clay-alkali mixture, prior to extrusion thereof, of a small amount of certain quaternary amines which are capable of imparting hydrophobicity to the normally hydrophilic kaolin surface facilitates the extrusion of the clay-alkali mixture. The amines employed for this purpose are quaternized ammonium bases (or salts thereof, such as chlorides and acetates) having an organic radical with at least 10 carbon atoms in a straight chain. Such ammonium bases are typically used in an amount of about 0.25 percent to 7.5 percent, based on the dry clay weight. As examples of suitable quaternary ammonium bases may be cited dioctadecyl dimethyl ammonium hydroxide, lauryl trimethyl ammonium hydroxide and didodecyl diethyl ammonium hydroxide.

The preferred method for forming 100/325-mesh zeolitic particles involves the initial step of preparing clay-alkali microspheres by a spray drying technique. In accordance with this method, the clay is mixed with the theoretical NaOH dosage, using dilute alkali, such as a 10 percent to 25 percent concentrated NaOH solution. The mixture is atomized into a heated chamber and mildly dried to bring the concentration of the alkali solution in the resultant microspheres to about 30 percent to about 55 percent. Care must be exercised during the spray drying to keep the temperature of the microspheres below that above which an undesirable sodium aluminosilicate contaminant will be formed by reaction between the alkali and the clay, as described hereafter.

FORMATION OF REACTION MASS FROM POROUS PREFORMED KAOLIN CLAY OR ALUMINUM SILICATE CATALYST MASS

It has been brought out hereinabove that a form of the method of the present invention involves the use as a reactant of certain porous coherent masses of a dehydrated aluminum silicate having a $SiO_2$ to $Al_2O_3$ mol ratio of about 2.00. These masses are preformed prior to their reaction with alkali, in accordance with the method of our invention and such masses may retain their form throughout the process. The aluminum silicate masses employed in our process must be uniformly porous to facilitate uniform absorption of the alkali solution therethrough, so as to permit complete conversion of the aluminum silicate structure into the desired zeolite. Preferably, the porous masses have an apparent density of about 1.00 gram per cubic centimeter to about 1.15 grams per cubic centimeter although masses of somewhat higher and lower densities may be used with good results, e.g., masses having an apparent density within the range of from about 0.80 to about 1.27. The aluminum silicate masses must also be coherent and resist slaking in the presence of the alkali solution in order that their form be retained throughout the process of our invention. Broadly speaking, we employ two means to achieve the requisite porosity and coherency in the dehydrated aluminum silicate masses made from kaolin clay, one involving the use of an additive or combination of additives to the kaolin clay prior to the formation of masses therefrom and the other involving acid-activation of kaolin clay to change the orientation of the alumina in the clay lattice without substantially altering the $SiO_2/Al_2O_3$ ratio of the clay, so that the resultant dehydrated mass has a materially greater porosity and coherency than the dehydrated kaolin without such acid-activation. The kaolin in either case is derived initially from one having a $SiO_2/Al_2O_3$ mol ratio as close to the theoretical value of 2 as is possible, e.g., a kaolin clay having a $SiO_2/Al_2O_3$ mol ratio of $2\pm.05$, although a small amount of sodium aluminate or sodium silicate may be added to the alkali absorbed into the aluminosilicate to bring the $SiO_2/Al_2O_3$ mol ratio in the composition to the theoretically required value when it is deficient in alumina or silica, respectively.

(a) *Preparation of Porous Dehydrated Kaolin Clay Masses*

In accordance with a preferred aspect of this embodiment of our invention, we admix a porosity-inducing agent with the hydrous clay prior to the formation of masses therefrom, employing a binder, such as NaOH, conjointly with the porosity-inducing agent unless a highly plastic grade of kaolin clay has been used. Pursuant to this embodiment of our invention, we mix to apparent homogeneity crushed kaolin clay, a small amount of binder if needed and, as a porosity-inducing agent, a finely divided combustible organic filler material, e.g., lampblack, wood flour, sawdust, etc., and water sufficient to make the resultant mixture plastic and amenable to the formation of shaped masses of the desired particle form and size. Then we calcine the masses to dehydrate the clay substantially completely, as hereafter described, and simultaneously burn out the finely divided organic filler so that fine pores are distributed throughout the alkali-bonded, dehydrated kaolin clay matrix.

Any known deflocculant for the clay which does not introduce an undesirable constituent into the clay may be used as a binding agent. Preferably, we use NaOH as the binding agent, taking care to add only sufficient NaOH solution in the subsequent absorption step that the total NaOH associated with the clay is the amount theoretically required for the formation of the type A zeolite. The NaOH used as a binder is ordinarily employed in an amount within the range of from about 0.25 to 2.5 percent, preferably about 0.5 to 1.0 percent, based on the volatile free weight of clay.

The amount of finely divided organic material we use with a view to promoting pores in the clay may vary within the range of from about 2 percent to about 25 percent, based on the volatile free weight of the clay, and is usually about 5 percent to about 15 percent. Although the porosity of the calcined clay masses is increased with increments in the amount of finely divided combustible material added to the clay, nevertheless, it will be observed that the hardness of the masses subsequent to dehydration is sacrificed if excessive combustible matter is used. For example, we have found that the hardness of an extruded dehydrated kaolin clay pellet prepared with sufficient finely divided wood flour to provide a fired pellet having an apparent density of 0.83 is inferior to that of a like pellet having an apparent density of 1.00, which we find to be the preferred apparent density. When the quantity of combustible material is limited to that which provides a fired pellet of about 1.35, extensive conversion of such a pellet to the type A zeolite is realized, although to a lesser degree than when a less dense, more porous pellet has been used.

*(b) Use of Aluminum Silicate Cracking Catalyst Masses*

As an example of an aluminum silicate cracking catalyst having the required $SiO_2/Al_2O_3$ ratio, we cite the high alumina content siliceous cracking catalyst made by the acid-activation of kaolin clay by the method which is the subject of a copending U.S. patent application, Serial No. 490,128, filed February 23, 1955, by Alfred J. Robinson et al., now Patent No. 2,967,157. Briefly stated, the method of this invention involves reacting kaolin clay with sulfuric acid and, without leaching the reaction product, calcining the reacted clay-acid mixture to desulfate it substantially completely. Preferably finely divided combustible is mixed with the clay and acid as a pore-producing agent, as set forth in the disclosure of the aforementioned patent application; sufficient combustible matter is preferably added to provide a catalyst having an apparent density of about 1.0. The $SiO_2/Al_2O_3$ weight ratio of the catalyst produced by this method will be essentially that of the kaolin clay precursor, and thus, when using such a cracking catalyst as a reactant in the process of the present invention, we employ a catalyst made from kaolin clay having a $SiO_2/Al_2O_3$ mol ratio as close to the theoretical value of 2.00 as possible. Catalysts made by numerous modifications of this process are contemplated as being suitable starting materials for our process, provided such catalysts have the proper silica-alumina balance. Another suitable cracking catalyst is that made from kaolin clay in accordance with the teachings of U.S. Patent No. 2,848,422, issued August 19, 1958, to Joseph J. Donovan et al. Also useful are semisynthetic cracking catalysts made from halloysite. Synthetic aluminum silicate catalysts prepared, for example, by coprecipitation of hydrous silica and hydrous alumina, may be suitable reactants for the method of our invention, when such catalysts have the required $SiO_2/Al_2O_3$ ratio. The aforementioned cracking catalysts are dehydrated aluminum silicates, which inherently possess the porous structure which is required in carrying out the method of the present invention. The catalysts may be further calcined at temperatures hereinabove set forth as suitable for dehydrating kaolin clay if they are not substantially fully dehydrated during their preparation. In this connection, it will be observed that, as in the case of preparing granules directly from kaolin clay, the catalyst we use is essentially free of mullite or other high temperature aluminum silicate, alumina or silica phases.

The porous dehydrated kaolin clay or catalyst mass is employed in the form of coarse particles of a size hereinabove set forth. The preparation of a pelleted kaolin cracking catalyst of suitable particle size is described in detail in said copending patent application to Alfred J. Robinson et al.; the preparation of a dehydrated kaolin cracking catalyst in the form of microspheres is described in Serial No. 556,768, filed February 21, 1956, by Powell et al., now abandoned.

The alkali that is sorbed into the above-described porous masses is used in the form of an aqueous solution whose concentration is from about 30 percent to about 55 percent by weight, with the upper concentration being limited by the solubility of the alkali at the reaction temperature employed, as well as the apparent need for a certain, although limited quantity of water in the mixture. Although alkali solutions of widely varying concentrations are useful in our process, the use of more concentrated solutions, i.e., 40 percent or more, is preferred inasmuch as the porous dehydrated aluminosilicate masses are converted into harder zeolitic aggregates when concentrated solutions are used.

Pursuant to a preferred embodiment of our invention we use the alkali in the form of a solution of such concentration that the theoretically required amount of NaOH will be completely absorbed uniformly within the porous aluminum silicate masses. Obviously, the quantity of alkaline liquid absorbed by the aluminum silicate without providing an external aqueous phase will depend on the sorptivity and, hence, apparent density of the aluminosilicate mass, and thus, dense aluminosilicates will require higher concentrations of alkali than less dense aluminosilicates in order to soak up the theoretically required amount of alkali. Accordingly, using a porous dehydrated kaolin clay or catalyst mass having an apparent density of about 1.0, the preferred NaOH concentration is about 50 percent; in the case of an aluminosilicate mass having an apparent density of about 1.25, the preferred NaOH concentration is about 55 percent.

The quantity of NaOH solution we employ, whatever the concentration, is that which will provide about 0.5 mol $Na_2O$ per mol of $SiO_2$ which is the amount which reacts stoichiometrically with the aluminosilicate having a $SiO_2/Al_2O_3$ mol ratio of 2.00 to form the type A zeolite. Preferably, we employ the theoretically required quantity of alkali, although $Na_2O/SiO_2$ ratios of $$0.5^{+.05}_{-.025}$$

may be employed without substantial deleterious effect. We avoid the use of excess alkali inasmuch as a sodium aluminosilicate will be formed along with or in place of the desired zeolite A and washing will not remove the contaminant.

When using porous preformed aluminum silicate masses as a reactant, the first stage of our process consists in contacting the porous aluminum silicate masses with the alkali solution in a manner such as to permit uniform absorption of the alkali within the pores of the aluminum silicate. The aluminum silicate may be immersed in the alkali solution if the alkali is sufficiently dilute to permit immersion of aluminum silicate masses therein. When more concentrated solutions are used, as in accordance with the preferred embodiment of our invention, the alkali may be sprayed, dripped or otherwise added to the porous aluminum silicate masses and blended therewith to permit uniform absorption of the alkali solution into pores of the aluminum silicate matrix. After absorption is completed, the reaction between the alkali and aluminum silicate is permitted to advance to completion, as set forth hereafter, with the formation of an amorphous, crystallizable reaction product of substantially the same volume and form as the alumnum silicate reactant.

INITIAL REACTION OF MASS TO FORM AMORPHOUS PRECURSOR OF CRYSTALLINE ZEOLITE

A characteristic of the method of our invention is that a homogeneous amorphous reaction product of dehydrated aluminum silicate and alkali is produced initially and this amorphous material is subsequently crystallized into the desired zeolite. The amorphous reacted mass is in the same form as the starting mass and is materially harder than the latter.

Employing the concentrated reactants and in the proportions set forth above, the reaction between the dehydrated aluminum silicate and the alkali to produce the amorphous precursor of the desired crystalline zeolite must be carefully controlled since such reactants tend strongly to form a sodium aluminosilicate which differs substantially in physical and chemical characteristics from the desired zeolite and which lacks sieve activity in dehydrated form. This other sodium aluminosilicate has essentially the X-ray diffraction characteristics of sodalite (as reported in ASTM Index, card 11–786), and tends to be formed in minor contaminating quantities or to the exclusion of the desired sodium A zeolite unless reaction is carefully controlled, as will be described.

In accordance with the method of the present invention the temperature of the mass, until all alkali is consumed, must be kept between the range of about 70° F. to about 200° F. at atmospheric pressure or at least autogenous pressure at the higher temperatures to prevent contamination by other sodium aluminosilicates, etc. At about 70° F. the reaction to form the homogeneous initial product will require about a week for substantial completion whereas at about 100° F. reaction time of the order of about a day will be required. It will be noted that the reacted mixture may be maintained for substantially longer time at such temperature levels without observable detrimental effect. Preferably, however, the temperature of the mass during reaction is maintained above about 100° F., particularly between the range of from about 115° F. to about 185° F. so that reaction is completed in several hours, e.g., between about 2 to 5 hours. If the mass temperature is permitted to rise above about 185° F., some difficulty may be experienced in controlling the temperature of the mass. If the temperature of any portion of the unreacted mass is permitted to rise substantially above about 200° F. the aforementioned sodium aluminosilicate contaminant will be formed in that portion of the mass and hence, if the entire unreacted mass is heated above about 200° F., the desired zeolite will not be produced.

Reaction is carried out without dissolving out or leaching soluble reactants or reaction products from the mass and without substantial loss of water from the mass. Reaction may be carried out in various environments. When reaction is conducted at relatively low temperatures, the reaction mass may be maintained in an atmosphere of inert uncirculated gas, such as air at a temperature between about 70° F. and about 100° F. Higher gas temperatures may be used employing high velocity recirculated gas, which in the case of air, should be substantially free from $CO_2$ which will form sodium carbonate with unreacted alkali and thus tie up the alkali in a form which will not react to form the desired zeolite with the dehydrated aluminum silicate. Thus, for example, a dilute slurry of dehydrated kaolin clay and NaOH in an amount to provide about 0.5 mol $Na_2O$ per mol of $SiO_2$ in the clay may be atomized into a spray drier, the resultant microspheres dried to a $H_2O/Na_2O$ ratio within the range of 4.5–11.5 mols and subjected to the action of high velocity recirculated air to advance reaction to completion.

Pursuant to a preferred embodiment of our invention, masses of the reaction mixture are immersed in and in contact with an organic liquid which is then heated to a temperature such that the temperature of the reaction mass does not exceed about 200° F. until reaction is completed. The organic liquid we employ may be any one which is immiscible with and unreactive with the alkali solution present within the mass, and which is characterized further by a boiling point in excess of the maximum temperature to be reached by the masses during their reaction which, as noted above, is never in excess of about 200° F. The organic liquid may be a hydrocarbon or, if desired, a halogenated hydrocarbon which is not hydrolyzed by the alkali or other organic liquids may be used. Preferably, such organic liquid has a relatively low distillation end point, such as 550° F. or less, so that it may be readily removed from the product, as by steam distillation. Using steam to free the reacted mass from occluded organic liquid, the crystallization of the amorphous reaction product may be carried out simultaneously. Another suitable method for carrying out the reaction involves immersing the reaction masses directly in an immiscible light petroleum cut, such as petroleum ether, which boils at a temperature below the maximum temperature to which it is desired to subject the masses. In this way reaction temperature is controlled by the boiling point of the organic liquid.

An important advantage of conducting the reaction while the clay-alkali mass is in the presence of an inert immiscible organic liquid is that carbon dioxide from the atmosphere is excluded from the reactants so that more extensive reaction between the aluminum silicate and alkali is possible and hence, higher yields of the zeolite are realized.

Depending on the crystallization procedure, the reacted masses may be maintained in the presence of the organic liquid or a substantial portion of the organic liquid may be drained or otherwise removed from the reacted mass prior to the crystallization step, as described hereafter.

Although the clay-alkali masses are preferably reacted in an environment of organic liquid or air under conditions to control the mass temperature during the reaction, other reaction environments should be feasible provided they are capable of controlling the mass temperature. Thus, the masses may be mixed with particulate inert matter, such as sand, which is of a different particle size or specific gravity from the reacted mass, and the whole heated to a temperature such that the reaction is advanced to completion while maintaining the mass temperature below about 200° F., and thereafter the particles of inert matter separated, as by screening, gravity separation or other methods that will readily suggest themselves to those skilled in the art.

No agitation of the mass is required during the reaction period and agitation strong enough to disintegrate the mass is to be avoided when such form is to be retained throughout the process.

The reaction is carried out under conditions such that the required amount of water is retained in the reaction mix for the formation of the zeolite. Accordingly, a closed reaction vessel is preferably used even when reaction is carried out at room temperature and operation under autogenous pressure or higher is particularly desirable when the mass is reacted under conditions such that its temperature is 115° F. or more. However, in making large batches of the zeolite at relatively low temperatures, the top layer of the reaction mixture may act, in effect, as a cover for the bulk of the mixture and thus insure the adequacy of the water content in the mixture.

To determine the minimum reaction time required for the completion of the reaction under the particular operating conditions employed, samples of the reaction product may be taken after various reaction intervals, crystallized (as hereafter described) and the intensity of the X-ray diffraction maxima studied. The reaction period should be prolonged until the product formed by crystallization of the amorphous reaction product gives rise to the most intense X-ray diffraction maxima characteristic of the desired zeolite.

CRYSTALLIZATION OF AMORPHOUS REACTION PRODUCT INTO SYNTHETIC CRYSTALLINE ZEOLITE

The amorphous reaction product is aged to convert it into polycrystalline state. The amorphous material will automatically convert to polycrystalline state if permitted to stand without dehydration at room temperature. Thus, after the amorphous material stands exposed to the atmosphere at room temperature for about 18 days, some conversion to the sodium zeolite A will be evident and the extent of conversion will increase with time. An unreacted mix of dehydrated kaolin clay and 40 percent NaOH solution maintained in a sealed container in an oven held at 100° F. will show incipient crystallization after about 52 hours and substantially complete formation of zeolite A after about 10 days. Crystallization, however, will be accelerated by subjecting the amorphous material (in the presence of a quantity of water at least theoretical for the formation of $Na_2O.Al_2O_3.2SiO_2.4-5H_2O$) to elevated temperature within the range of from about 150° F. to about 325° F. for at least an hour, and usually 4 to 6 hours or more, under autogenous or higher pressure. Crystallization at elevated temperature may be accomplished by heating the amorphous reacted mass, in air or other reaction medium above set forth, in a covered vessel. If desired, the mass may be retained in the same vessel used in the reaction step during the crystallization. An advantage of this procedure is that there is no leaching of soluble material during the crystallization. Still another suitable method for crystallizing the amorphous reaction product involves refluxing the amorphous material in water, using a small amount of dilute alkali, if desired, to promote crystallization. Refluxing may be continued up to 48 hours or more without adverse effect. The polycrystalline aggregates may then be separated from the liquor, as by decantation, washed to remove free alkali if any is present, and air dried if a dry zeolite is required.

It has been mentioned that an inert organic liquid which boils at a temperature in excess of 200° F. may be effectively removed from the masses simultaneously with the crystallization of the masses by subjecting the reacted mass to the action of saturated or supersaturated steam under conditions such that the distillate is removed from the mass. Steaming is continued until crystallization is completed and residual organic liquid is removed. All or a substantial part of the organic liquid may be drained from the masses prior to steaming so that only a small amount of occluded liquid need be steam distilled, in which case crystallization may be completed by discontinuing steaming and holding the masses at elevated temperature under autogeneous or higher pressure. Alternatively, the amorphous masses may be maintained in the organic liquid and the whole held at elevated temperature under at least autogenous pressure until crystallization is completed and the crystallized masses separated from the bulk of the organic liquid, as by decantation, and residual organic liquid stripped from the masses, as by steaming.

When the product is to be marketed in the dehydrated (or sieve) form the organic liquid can be burned from the inorganic matter during the step of dehydrating the zeolite provided the liquid is one which will oxidize substantially completely below the temperature at which the zeolite lattice is stable.

The zeolite may be dehydrated substantially completely to form the sieve material by calcining at a temperature within the range of from about 220° F. to about 1200° F. or somewhat higher, and usually between about 400° F. to about 700° F. The calcination time will depend on calcination temperature and atmosphere. The zeolite may be partially dehydrated for use in particular applications.

The sodium zeolite A we produce has a simple cubic crystal structure and a composition, expressed in terms of mols of oxides present (water free basis) as follows:

$$SiO_2/Al_2O_3, 2\pm0.05$$

$$Na_2O/SiO_2, 0.5 ^{+0.05}_{-0.025}$$

The unit cell dimension of the equilibrated hydrated sodium zeolite A was determined from X-ray powder diffraction patterns to be 12.27 A. The more significant $d$ values and corresponding line intensities for our sodium zeolite A are given below in Table A, wherein values were obtained from the X-ray powder diffraction pattern, using the $K\alpha$ doublet of copper, an X-ray diffractometer using a scintillation counter and a strip chart pen recorder. The relative intensity of the peaks and the interplanar spacing ($d$ values) were calculated from the peak heights recorded on the chart in conventional manner. Also reported in Table A are significant $d$ values and relative peak intensities for the sodium aluminosilicate compound (believed to be sodalite) which forms as a contaminant or to the exclusion of the sodium zeolite A when reactant quantities and temperatures are not strictly controlled within the critical limits set forth above.

TABLE A.—$d$ VALUE AND RELATIVE INTENSITY OF REFLECTION IN ANGSTROM UNITS

| Sodium Zeolite A | | Sodium Aluminosilicate Contaminant | |
|---|---|---|---|
| $d$ Spacing, A. | Relative Intensity, 100 I/I₀ | $d$ Spacing, A. | Relative Intensity, 100 I/I₀ |
| 12.27 | 100.0 | 6.32 | 60.5 |
| 8.66 | 76.0 | 4.45 | 4.2 |
| 7.05 | 45.0 | 3.62 | 100.0 |
| 5.50 | 35.8 | 2.96 | 4.2 |
| 4.35 | 10.2 | 2.80 | 27.2 |
| 4.11 | 54.0 | 2.56 | 40.8 |
| 3.72 | 83.4 | 2.37 | 9.9 |
| 3.41 | 24.4 | 2.24 | 2.8 |
| 3.29 | 75.5 | 2.09 | 32.4 |
| 2.98 | 92.2 | 1.81 | 5.6 |
| 2.89 | 14.1 | 1.74 | 11.2 |
| 2.75 | 16.7 | | |
| 2.62 | 57.7 | | |
| 2.05 | 12.8 | | |
| 1.74 | 17.9 | | |

To provide other forms of zeolite A, the hydrated sodium zeolite A may be base-exchanged with other monovalent cations, such as ammonium, hydrogen, potassium and lithium; group II metal ions such as magnesium, calcium and strontium; and ions of transition metals such as nickel, titanium, chromium, iron, manganese, tungsten, as well as others whose atomic numbers are from 21–28, inclusive, 39–46, inclusive, and 72–78, inclusive. These other forms of zeolite A have essentially the same X-ray powder diffraction pattern characteristic of the sodium form set forth in Table A, and have a cubic cell unit between about 12.0 and 12.4 A. Upon dehydration, as described above, these base-exchanged zeolites become sorbents of controlled effective pore diameter. The base-exchange step is conveniently accomplished by soaking, percolating, or otherwise contacting the zeolite with a dilute aqueous solution of a mineral acid salt of the above-mentioned ions (or other exchangeable ions) until the desired degree of ion-exchange has taken place.

From the preceding description of the invention, it will be readily apparent that an important feature of the method of our invention is that we have been able to provide for the first time hard coherent aggregates of type A zeolites, both the parent sodium zeolite A and base-exchanged reaction products, as well as the various sorbents produced by dehydrating such zeolites, without resorting to the step of binding powdered masses. Moreover, our zeolitic aggregates are materially more resistant to attrition than prior art bound masses and the difference is readily obvious by comparing the ease with which such bound masses are crushed or broken by hand with the difficulty in breaking up the zeolitic masses produced by the method of the subject invention. Our zeolitic aggregates, even in the hydrated form, are resistant to breakdown in the presence of liquid water.

The following examples of the practice of our invention are given for illustrative purpose only and are not to be construed as limiting our invention thereto.

EXAMPLE I

In this experiment hard, binder-free pellets composed essentially of pure sodium zeolite A were prepared from calcined kaolin clay.

The clay used in the example is known as Klondyke Water Washed kaolin, a high purity kaolinitic clay mined in Georgia and degritted by hydraulic classification. The $SiO_2/Al_2O_3$ weight ratio of the clay was 1.141. The powdered clay was calcined at 1400° F. for 17 hours to a volatile matter content of 0.6 percent before conversion into the zeolite, in accordance with the following steps:

Formation of Pellets and Reaction 60.0 parts by weight of the calcined kaolin was mixed and thoroughly blended with 43.2 parts by weight of a 50 percent (by weight) NaOH solution. The mixture was compressed in a 1" die and extruded through a die plate with $3/16$" holes ($1/2$" land). The extrudate was cut in pellets about $1/4$" long and the pellets were placed in an oven maintained at 100° F. for 96 hours to complete the reaction between the kaolin and the caustic. The pellets were hard at this stage. Analysis of X-ray diffraction intensity maxima indicated that only a very minor amount of the 4A zeolite was formed at this point.

Crystallization

The reacted pellets were refluxed in dilute caustic solution to crystallize the amorphous constituent into the 4A sodium zeolite. 5 parts by weight of 5 percent NaOH solution were used for each 1 part by weight of reacted pellets. After 2 hours of reflux, there was substantial formation of the 4A zeolite crystals and crystallization was substantially complete after a total of 4 hours of reflux. The pellets were water washed with several portions of distilled water to remove any free alkali.

The pellets made in this run were hard polycrystalline masses of about the same volume as the original pellets.

EXAMPLE II

This example illustrates another embodiment of our invention.

60.0 parts by weight of the calcined kaolin of Example I was mixed to apparent homogeneity with 43.2 parts by weight of 50 percent NaOH solution and the mix compressed in a $2 1/4$" die. The compacted pieces hardened in less than one day, after which they were broken up into $1/2$" to 1" fragments. The fragments were placed in a sealed vessel and permitted to stand at room temperature for a total of 18 days and the fragments were further broken up in $1/4$" pieces. At this stage a very small amount of the 4A zeolite was present.

A portion of the $1/4$" pieces were permitted to stand in air at room temperature for about two months; it was found that there was substantial formation of crystals of the 4A zeolite.

Another portion of the $1/4$" pieces was treated to accelerated crystallization by refluxing in a dilute NaOH solution using 1.0 part by weight of the pieces per 5.0 parts by weight of a 5 percent NaOH solution separating the pieces and washing them with several portions of distilled water. After 1 hour, there was substantial zeolite formation which increased by refluxing for a total of 4 hours.

All of the zeolite pieces were very hard and difficult to break.

EXAMPLE III

This example illustrates one aspect of the superiority of zeolite masses of the present invention over a commercial clay-bonded zeolite wherein the relative intensity of X-ray diffraction line intensity of masses of hydrated zeolite A are compared, such intensity being a function of the sodium zeolite A content of the masses and being directly correlated with the sorptive capacity of the masses.

The commercial sodium zeolite A investigated was in the form of 4–8 mesh spheres which were fully rehydrated prior to X-ray analysis. The spheres were prepared, to the best of applicants' knowledge, by bonding the powdered sodium zeolite A with a colloidal clay.

A sample of sodium zeolite A, prepared in accordance with a procedure representative of the method of the present invention was prepared by mixing 18 grams of 40 per cent NaOH solution with 20 grams of Klondyke Water Washed kaolin clay, previously calcined at 1400° F. for 2 hours. The mixture was placed in a tightly covered crucible and held in an oven maintained at 100° F. for about 24 hours. The crucible containing the reacted mass the transferred to a 200° F. oven with the cover kept intact. The mass was kept in the oven for about 24 hours, after which it was cooled, and left overnight to equilibrate with the atmosphere.

X-ray diffraction patterns of the above zeolites were obtained employing standard conditions, i.e., using the Ka doublet of copper as the radiation, an X-ray diffractometer using a scintillation counter and a strip chart pen recorder. The peak heights and positions as a function of the Bragg angle were recorded on the chart and from these the relative intensity of the peak corresponding to the recorded lines were determined.

The relative intensity at the 7.2°2$\theta$ peak was 56 units for the clay-bonded spheres and was 68 units for the zeolite made from calcined kaolin. The relative intensity at the 14°2$\theta$ line, characteristic of sodalite, was 1 unit for both samples.

These results show that the zeolite content of masses prepared from calcined kaolin is substantially higher than that of masses prepared with clay-bonded zeolite powder.

EXAMPLE IV

This example illustrates the reaction of clay and alkali in an oil reaction medium followed by crystallizing the reacted product in the same oil medium.

20 parts by weight of crushed Klondyke Water Washed kaolin clay, calcined at 1400° F. for about 16 hours, was uniformly mixed with 18 parts by weight of 40 percent NaOH solution and the mix formed into rods about $1/8$". The rods were immersed in white mineral oil and the oil maintained at 100° F. for 4 days. The oil-immersed rods were transferred to a oven maintained at 200° F. and held there for about 24 hours. The oil was drained from the rods and a portion of residual oil rubbed from the rods. The rods were allowed to equilibrate with the atmohphere overnight. X-ray diffraction patterns indicate a considerably greater 7.2°2$\theta$ peak intensity than the rehydrated commercial clay-bonded zeolite.

EXAMPLE V (a) This example illustrates the necessity for maintaining the mass temperature below the boiling point of water during the reaction step.

20 parts by weight of calcined Klondyke Water Washed kaolin (1400° F./17 hrs.) was mixed with 15 parts by weight of a 40 percent solution of NaOH. A 36 gram ball of the mixture was wrapped in polyethylene film with a thermocouple junction inserted in the center of the ball. The film-wrapped ball was immersed in an oil bath and the oil held at about 140° F. The mass temperature as a function of time was recorded automatically on strip chart by a pen linked with the thermocouple. The mass temperature rose to about 225° F. in about 30 minutes, staying at 212° F. or higher for a total of 7 minutes and gradually declining to bath temperature after about 2 hours. The polyethylene film was removed and the reacted mass immersed in oil and placed in an oven maintained at 200 F. for about 24 hours for crystallization. The X-ray diffraction pattern of the product indicated substantial formation of sodalite with only a small amount of zeolite A formation. The line intensity for the 7.2°2θ peak was only 15 units whereas the 14°2θ peak was 19 units. Thus, subjecting the mass to a temperature above the boiling point under autogenous pressure, even for a short period of time, has a very marked detrimental effect on the ultimate product.

(b) Example V, paragraph (a), was repeated in every detail with the exception that a ball half the weight of that used in Example V, paragraph (a), was employed so as to permit lower mass temperature under identical reaction conditions. The mass reached a peak temperature of 183° F. and was permitted to stand for about a half day in the oil bath maintained at about 140° F., after which it was crystallized as in Example V, paragraph (a). The product was ground and equilibrated overnight before an X-ray pattern was obtained. The X-ray pattern showed extensive formation of the sodium zeolite O with negligible sodalite production.

EXAMPLE VI

This example illustrates the preparation of a pelleted binder-free zeolite from porous calcined kaolin clay pellets. The kaolin clay used in the experiment was a water washed Georgia clay having the following analysis: $SiO_2$, 45.42%; $Al_2O_3$, 38.78%; $Fe_2O_3$; 0.31%; $TiO_2$, 1.78%; volatile matter, 13.78%. The $SiO_2$ to $Al_2O_3$ weight ratio of the clay was 1.16.

Porous kaolin clay pellets were made by mixing to apparent homogeneity 100 parts by weight of kaolin clay with 2 parts by weight of 50 percent NaOH solution, 15 parts by weight of wood flour and 48.0 parts by weight of distilled water and extruding the mixture through a die plate having $1/16''$ holes to form pellets $1/16''$ in diameter. The pellets were calcined at 1400° F. for 17 hours to burn out the wood flour and dehydrate the clay. The density of the pellets was 1.09 as measured by mercury displacement.

A 36 percent dosage of NaOH in the form of a 40 percent solution is sorbed uniformly into the pellets and soaked for 24 hours at room temperature. After 24 hours the pellets are refluxed in dilute alkali for 6 hours, using 5 parts by weight of 5 percent NaOH solution to 1 part by weight of pellets. At the end of this period the pellets are washed with distilled water and dried at room temperature.

It will be found that somewhat harder pellets are produced when using 5 to 10 parts by weight of wood flour to 100 parts by weight of kaolin in the pelleting step.

EXAMPLE VII

This example illustrates the preparation of a pelleted binder-free zeolite from calcined kaolin clay pellets and is similar to Example VI, with the exception that the pellet forming step differs.

50 parts by weight of the kaolin clay used in Example VI was mixed to apparent homogeneity with 1 part by weight of a 50 percent NaOH solution, 12.5 parts by weight of lampblack and 22.5 parts by weight of distilled water. The mixture was extruded to form $1/16''$ diameter pellets and the pellets calcined at 1400° F. for 17 hours to burn out the lampblack and dehydrate the clay. The apparent density of the calcined pellets as measured by mercury displacement was 1.03 grams per milliliter.

The calcined pellets are reacted at room temperature for 24 hours with a 36 percent dosage of NaOH in the form of a 55 percent solution. The reacted pellets are refluxed for 6 hours using 5 parts by weight of 5 percent NaOH solution to 1 part by weight of pellets, washed with distilled water and dried at room temperature.

Using 22.8 parts by weight of lampblack black per 50 parts by weight of kaolin in the pellet forming step, the apparent density of the calcined pellets was 0.83 gram per milliliter. These pellets produce a softer zeolite than the more dense pellets when reacted, as above, with alkali.

EXAMPLE VIII

This example illustrates the conversion of a cracking catalyst into the sodium zeolite A. The catalyst employed in this example had a $SiO_2/Al_2O_3$ weight ratio of 1.14 and was prepared by the activation of kaolin clay with sulfuric acid by the process described in a copending U.S. patent application Serial No. 490,128. The catalyst was provided in the form of 30/60-mesh material and had an apparent density of 1.25.

Fractions of the catalyst particles were separately reacted with a 36 percent dosage of NaOH in the form of solutions of concentrations varying from 30 percent to 50 percent. The catalyst particles are soaked for 24 hours in the various solutions after which each reaction product was crystallized by refluxing for 6 hours in dilute caustic.

We claim:

1. A method for making a synthetic crystalline zeolite in the form of coherent microspheres of substantially homogeneous polycrystalline composition which comprises forming an apparently homogeneous mixture consisting essentially of finely divided dehydrated kaolin clay and an aqueous solution of NaOH in an amount to provide about 0.5 mol of $Na_2O$ per mol of $SiO_2$ in said mixture, spray drying the mixture under conditions such that the $H_2O/Na_2O$ mol ratio in the resultant microspheres is within the range of from about 4.5 to about 11.5, reacting the clay with said NaOH while maintaining said microspheres out of contact with an external aqueous liquid phase and controlling the temperature of the microspheres within the range of about 70° F. to about 200° F. until an amorphous homogeneuos reaction product is formed, and aging said amorphous reaction product at a temperature from about 70° F. to about 325° F. under at least autogenous pressure to convert said amorphous reaction product into coherent microspheres of substantially homogeneous crystalline zeolitic composition.

2. A method for making a synthetic crystalline zeolite which comprises providing shaped masses of an apparently homogeneous mixture of a dehydrated aluminum silicate having a $SiO_2$ to $Al_2O_3$ mol ratio of about 2.0, and an aqueous solution of NaOH, said aqueous solution having a concentration such that the $H_2O/Na_2O$ mol ratio in the mixture is from about 4.5 to about 11.5, and being present in an amount such that the $Na_2O/SiO_2$ mol ratio in said mixture is about 0.5, reacting said aluminum silicate and said NaOH while said masses are immersed in and in contact with an organic liquid which is water-immiscible and nonreactive with said NaOH solution while controlling the temperature of said masses within the range of from about 70° F. to about 200° F. to form a homogeneous amorphous reaction product, said organic liquid being further characterized by having a boiling point in excess of the maximum temperature of said masses during reaction, and aging said amorphous reaction product in the presence of said organic liquid at a temperature of from about 70° F. to about 325° F. for a time sufficient to convert said amorphous reaction product into the desired polycrystalline zeolite in the form of shaped masses.

3. A method for making a synthetic crystalline zeolite which comprises providing shaped masses of an apparently homogeneous mixture of dehydrated kaolin clay and an aqueous solution of NaOH, said aqueous solution having a concentration of from about 30 percent to about 55 percent and being present in an amount to provide about 9.0 gram mols of NaOH per kilogram of said clay, on a volatile free clay basis, reacting said clay and said NaOH while said masses are surrounded by an organic liquid which is water-immiscible and nonreactive with said aqueous solution of NaOH while controlling the temperature of said masses within the range of from about 70° F. to about 200° F. to form a homogeneous amorphous reaction product, said organic liquid being further characterized by having a boiling point in excess of the maximum temperature of said masses during reaction, subjecting the reacted shaped masses to the action of saturated steam for a time sufficient to distill at least a substantial portion of said organic liquid from said shaped masses and to convert said amorphous reaction product into the desired crystalline zeolite in the form of shaped masses.

4. A method for making a synthetic zeolite directly in the form of coherent substantially uniformly sized pellets of substantially homogeneous polycrystalline composition which comprises mixing finely divided dehydrated kaolin clay to apparent homogeneity with about a 30 percent to a 55 percent aqueous solution of NaOH in an amount to provide about 9.0 gram mols of NaOH per kilogram of said clay, on a volatile free clay basis, extruding the resultant mixture to form uniformly sized pellets, reacting said clay and said NaOH under at least autogenous pressure while said masses are immersed in an organic liquid which is water-immiscible and nonreactive with said NaOH solution while controlling the temperature of said masses within the range of from about 100° F. to about 185° F. to form a homogeneous amorphous reaction product, said organic liquid being further characterized by having a boiling point in excess of the maximum temperature of said masses during reaction, separating reaction product from a substantial portion of said organic liquid, and subjecting the reacted pellets to the action of saturated steam for a time sufficient to distill residual organic liquid from said masses and to convert said amorphous reaction product into the desired zeolite in the form of pellets.

5. A method for making a synthetic zeolite in the form of coherent shaped masses which comprises absorbing about 9.0 gram mols of NaOH in the form of an aqueous solution of from about 30 percent to about 55 percent concentration into 1.0 kilogram of uniformly microporous shaped masses of kaolin clay cracking catalyst having a $SiO_2$ to $Al_2O_3$ mol ratio of $2\pm0.05$, reacting said catalyst with absorbed alkali while maintaining said masses out of contact with an external aqueous liquid phase while controlling the temperature of said masses within the range of from about 70° F. to about 200° F. until a coherent homogeneous amorphous reaction product is formed, and aging said amorphous reaction product without dehydration thereof at a temperature within the range of from about 70° F. to about 325° F. for a time sufficient to convert said amorphous reaction product into the desired crystalline zeolite in the form of shaped masses.

6. A method for making a synthetic zeolite directly in the form of coherent crystalline aggregates which comprises absorbing an aqueous solution of NaOH having a $H_2O/Na_2O$ mol ratio of from about 4.5 to about 11.5 into microporous masses of acid-activated kaolin cracking catalyst having a $SiO_2/Al_2O_3$ mol ratio of $2\pm0.05$ in an amount such that about 0.5 mol of $Na_2O$ is absorbed per mol of $SiO_2$ in said catalyst, heating said catalyst with absorbed alkali solution without dissolving solubles therefrom and while controlling the temperature of said masses within the range of from about 100° F. to about 185° F. and maintaining said masses under at least autogenous pressure, until substantially homogeneous amorphous reacted masses are formed, and heating said reacted masses without substantial dehydration thereof at a temperature within the range of from about 150° F. to 325° F. for a time sufficient to crystallize said amorphous mass substantially completely.

7. A method for making a synthetic zeolite in the form of coherent polycrystalline shaped masses which comprises mixing finely divided kaolin clay to apparent homogeneity with water and a finely divided combustible organic material, forming shaped masses therefrom, calcining said shaped masses at a temperature within the range of from about 800° F. to about 1600° F. for a time sufficient to dehydrate said kaolin clay substantially completely and burn out said organic material, thereby providing uniformly microporous masses of dehydrated kaolin clay, absorbing about 9.0 gram mols of NaOH in the form of an aqueous solution of from about 30 percent to about 55 percent concentration into 1.0 kilogram of said shaped masses, reacting said dehydrated kaolin clay with absorbed alkali without dissolving water solubles therefrom and while controlling the temperature of said masses within the range of from about 70° F. to about 200° F. until a coherent homogeneous reaction product is formed, and aging said amorphous reaction product under at least autogenous pressure at a temperature within the range of from about 70° F. to about 325° F. for a time sufficient to convert said amorphous reaction product into the desired crystalline zeolite in the form of shaped masses.

8. A method of making a synthetic crystalline zeolite in the form of coherent pellets which comprises mixing finely divided dehydrated kaolin clay to apparent homogeneity with about 0.25 percent to about 7.5 percent by weight, on a volatile free clay basis, of a quaternary ammonium base having an organic radical with at least 10 carbon atoms in a straight chain and an aqueous solution of NaOH having a concentration such that the $H_2O/Na_2O$ mol ratio in the mixture is within the range of from about 4.5 to about 11.5 and being present in an amount such that the $Na_2O/SiO_2$ mol ratio in the mixture is about 0.5, extruding the resultant mixture to form substantially uniformly sized pellets, reacting said clay with said NaOH while maintaining said pellets out of contact with an external liquid aqueous phase while controlling the temperature of said pellets within the range of from about 70° F. to about 200° F. and without evaporating water from said mass until a coherent homogeneous amorphous reaction product is formed, and aging said amorphous reaction without evaporating water therefrom at a temperature of from about 70° F. to about 325° F. for a time sufficient to convert said amorphous reaction product into a synthetic crystalline zeolite in the form of hard pellets.

References Cited in the file of this patent

UNITED STATES PATENTS

| | | |
|---|---|---|
| 1,477,757 | Hughes et al. | Dec. 18, 1923 |
| 2,143,670 | Young | Jan. 10, 1939 |
| 2,544,695 | Kumins | Mar. 13, 1951 |
| 2,768,145 | Tongue et al. | Oct. 23, 1956 |
| 2,840,530 | Milliken et al. | June 24, 1958 |
| 2,882,243 | Milton | Apr. 14, 1959 |

OTHER REFERENCES

Kumins et al.: Ind. and Eng. Chem. 45, 567–572 (1953).

Linde publication, "Physical Properties of Linde Molecular Sieves," Form 9947, published Aug. 19, 1957.